O. SAGE.
Cheese Vat.
No. 62,690.
Patented March 5, 1867.
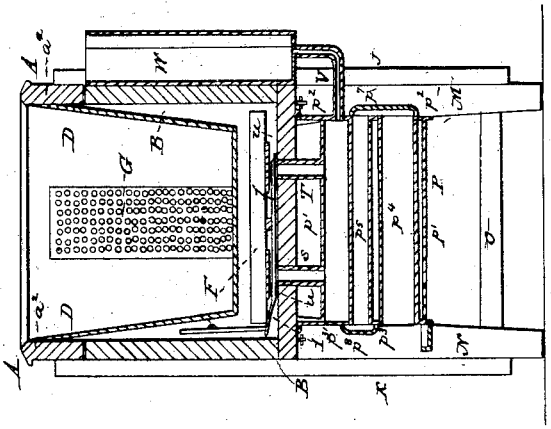
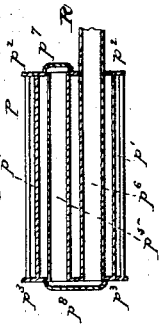
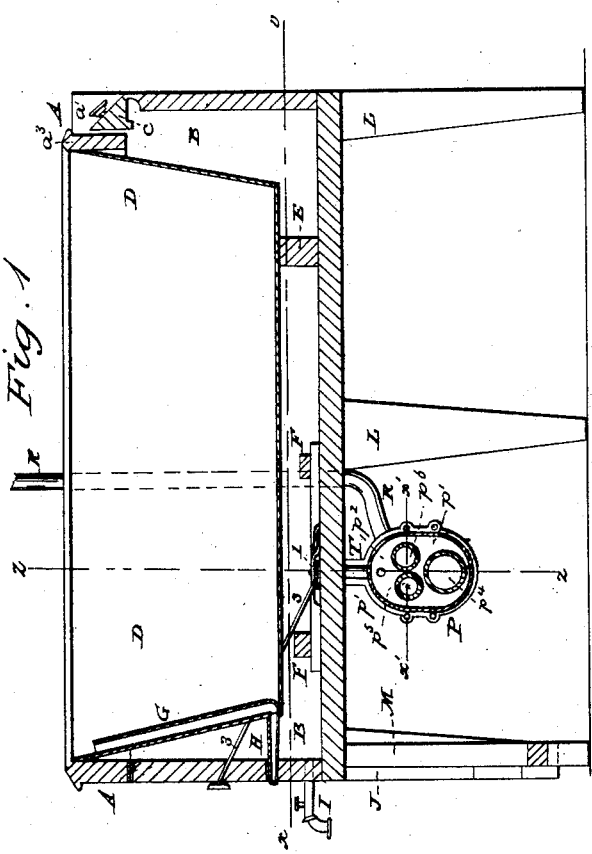
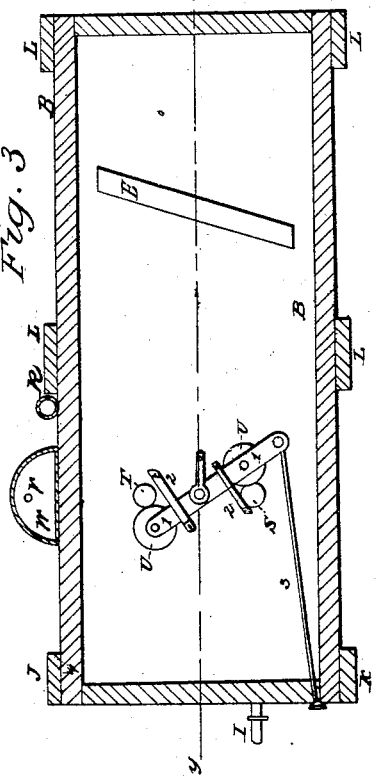

United States Patent Office.

ORRIN SAGE, OF WELLINGTON OHIO.

Letters Patent No. 62,690, dated March 5, 1867.

---

IMPROVEMENT IN CHEESE VATS.

---

The Schedule referred to in these Letters Patent and making part of the same.

---

TO ALL WHOM IT MAY CONCERN:

Be it known that I, O. SAGE, of Wellington, in the county of Lorain, and State of Ohio, have invented a new and useful Improvement in Cheese Vats; and I do hereby declare that the following is a full, clear, and exact description thereof, which will enable others skilled in the art to make and use the same, reference being had to the accompanying drawings, forming a part of this specification, in which—

Figure 1 is a vertical longitudinal section of my improved cheese vat, taken through the line $y\,y$, fig. 3.
Figure 2 is a horizontal section of the same, taken through the line $x\,x$, fig. 1.
Figure 3 is a vertical cross-section of the same, taken through the line $z\,z$, fig. 1.
Figure 4 is a horizontal section of the heater, taken through the line $x'\,x'$, fig. 1.
Similar letters of reference indicate like parts.

My invention has for its object to furnish an improved cheese vat, by means of which the heat applied to the milk box may be regulated as desired, and the performance of the various operations necessary in the preparation of the curd greatly facilitated; and it consists, first, in the combination of the milk box with the hinged frame, to which it is attached, and with the water box, in which it sets; second, in the heater, constructed as hereinafter described, in combination with the water box, and with the reservoir into which the heat escapes when shut off from said water box; third, in the combination of valves, constructed and operated as hereinafter described, with the water box and with the pipes of the heater; and, fourth, in the combination of the hinged feet with the water box, the whole being constructed and arranged as hereinafter more fully described.

A is a frame, hinged to the upper edge of one end of the water box B, as shown in fig. 1. The side pieces $a^1$ and $a^2$ of this frame are of the same length as the water box B, but the end piece $a^3$ is set in a little, as shown in fig. 1, so as to leave a vent, flue, or opening between the end of the frame A and the end of the box B for the escape of steam or surplus heat when required, and also for the introduction of water into said box B. This opening is closed by a block or cap, C, as shown in fig. 1. To the upper edge of the frame A is attached the milk box D, which may hang suspended in the water box B, or its bottom may rest upon blocks, E, or other supports, F, placed in the bottoms of said water box B. The box D is made of a less size at the bottom than at the top, so that the heated water in the box B may have free circulation all around it. At one end of the box D is placed a strainer, G, which keeps the curd from running off with the whey. From the lower edge of the end of the box D, in the rear of the strainer G, a small pipe, H, leads out through the end of the box B, by means of which the whey can be drawn off when required. This pipe should be furnished with a stop-cock, should pass through the end of the box B water-tight, and should be set in such a direction that it will pass out of and into the hole in the box B upon the raising or lowering of the box D. The water box B is simply a rectangular wooden box, and it is furnished with a discharging pipe, I, and stop-cock for drawing off the water when required. Two, J and K, of the legs that support the cheese vat are made shorter than the others, L, and to these short legs J and K, or to the bottom of the water box B, are pivoted supplementary legs, M and N, connected by a cross-bar, O. When these legs M and N are in the position represented in the drawings the vat stands square and firm; but when it is desired to draw off the water or whey, by swinging back the legs M and N, this end of the vat may be lowered so as to permit the water or whey to run off freely. The body $P^1$ of of the heater P is made of sheet metal, and the ends $P^2$ and $P^3$ of cast metal. Through this heater, from end to end, run three flues, $P^4$, $P^5$, and $P^6$; the lower one, $P^4$, of which is the larger, and in it is built the fire. The rear ends of the flues $P^4$ and $P^5$, and the front ends of the flues $P^5$ and $P^6$, are connected by hollow caps, $P^7$ and $P^8$, so that the smoke and heat from the fire pass from the flue $P^4$ to the flue $P^5$, from the flue $P^5$ to the flue $P^6$, and thence into the chimney through the pipe R. The space around the flues is filled with water, and said space is connected with the interior of the water box B by two pipes, S and T. As the water in the heater is heated by the fire it rises through the pipes S and T into the water box B, the colder water from which passes back into the heater, thus distributing the heat equally around all sides of the milk box D. When the milk has been sufficiently heated, the communication between the heater P and the box B is cut off by the valves U, which cover the mouths of the pipes S and T, the connecting-bar 1 of which is pivoted to the bottom of the box B, and is kept in place by the guards 2, as shown in fig. 3. To one end of the bar 1 is attached a rod, 3, passing up between the boxes B and D, and out through the end of the box B, as shown in figs. 1, 2, and 3, by means of which the valves U are operated. When the valves U are closed so that the heated and expanding water can no longer pass into the box B it escapes through the relief pipe V into the reservoir W, so that it is not necessary to let the fire in the heater go down, and thus, when the curd is ready for scalding, a quick heat can be obtained.

I claim as new, and desire to secure by Letters Patent—

The arrangement of the valve U and rod 3, in combination with the box B, in the manner and for the purpose herein specified.

ORRIN SAGE.

Witnesses:
E. G. DIXON,
C. BAILY.